July 6, 1965

J. H. CLARK ET AL 3,193,443

SEMI-CONDUCTOR HEADER

Filed Nov. 4, 1960

INVENTORS:
JAMES H. CLARK
RAFAEL LANDRON, JR.

BY H.D. Copeland Jr.
AGENT.

United States Patent Office 3,193,443
Patented July 6, 1965

3,193,443
SEMI-CONDUCTOR HEADER
James H. Clark and Rafael Landron, Jr., Richardson, Tex., assignors to Texas Instruments Incorporated, Dallas, Tex., a corporation of Delaware
Filed Nov. 4, 1960, Ser. No. 67,416
3 Claims. (Cl. 161—196)

This invention relates generally to processes for making glass articles in which the glass is molded directly to a metal or other material holder to form an assembly which includes a substantial glass volume. More specifically, this invention relates to a method of forming a molded glass transistor header assembly and to the product resulting therefrom.

It has been the practice in the past to mold glass into header eyelets having a small bottom opening by allowing the surface tension of the molten glass substantially to retain the glass in the desired shape until it had hardened. This practice is unsatisfactory because the glass tends to migrate up or down any surface areas adjacent to the opening (as seen in FIGURE 3). It then became the practice to seal off the bottom opening by adding certain blocking materials, such as a small carbon block (as seen in FIGURE 4), to prevent the glass from migrating to areas where it is not wanted.

These prior art processes, however, involved difficulties which until the present time had not been satisfactorily resolved. The first mentioned practice resulted in the production of an unattractive finished product and one in which the exposed glass interfered with subsequent assembly operations such as the placement and soldering of a semiconductor onto the header. The subsequent mentioned practice included two outstanding detriments in that it required an additional costly, time consuming operation and the resulting hardened glass included minute gas bubbles due to the carbon-dioxide formed when the carbon block was heated by the molten glass in the presence of the oxide film on the surface of the metal header eyelet. The surface oxide film is desirable otherwise as it provides a good surface bond between the glass and metal to form a glass to metal seal or joint.

This invention, briefly, embodies a sharp indentation directly in the path over which the molten glass would ordinarily migrate, and the sharp corner of this indentation acts as a boundary to define the area in which the finished glass structure will be confined.

A primary object of this invention is to provide a process by which glass may be molded in a transistor header eyelet in such a relationship that the glass is bonded to both the header eyelet and to any electrical leads or terminals that are positioned within the eyelet at the time of the molding operation.

Another object of this invention is to provide a process by which glass may be molded in a transistor header in a mass production assembly-line type of operation and wherein certain problems which existed in similar prior art processes have been eliminated by virtue of this invention.

An additional object of this invention is to provide a transistor header assembly which avoids the prior art difficulty of having the glass which is molded into the open central area of the header eyelet protrude beyond the restricted area in which it is desired that the glass be retained.

Another object of this invention is to provide a transistor assembly which comprises a substantially large volume of molded glass, but in which the glass does not interfere with subsequent operations.

It is a still further object of this invention to provide a transistor product which includes a substantial amount of glass in its construction, but in which the glass is satisfactorily retained within an enclosed area, does not present ragged edges where it has migrated beyond the desired area to possibly interfere in subsequent electrical connections or mounting or soldering operations, and does not detract from the smooth, streamlined appearance of the finished product.

These and other objects will be apparent from an examination of the following specification and by reference to the figures of the drawing in which:

FIGURES 3 and 4 represent prior art methods of manufacturing a similar transistor header assembly;

Figure 1:
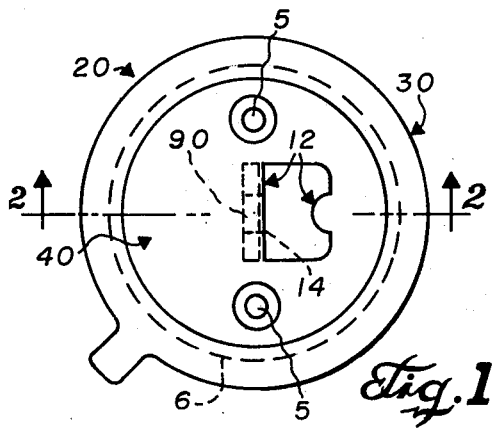
FIGURE 1 represents a top plan view of the transistor header assembly of this invention.
Figure 2:
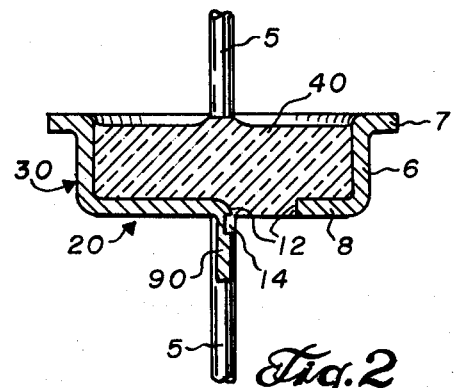
FIGURE 2 is a cross-sectional view taken along the line 2—2 of FIGURE 1.
Figure 5:
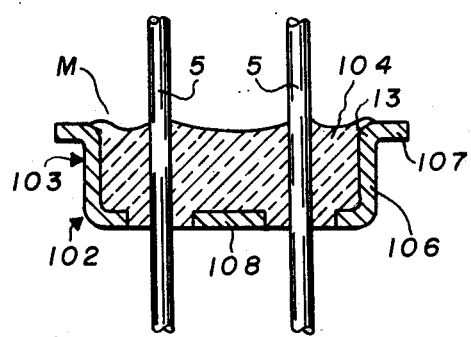
Figure 6:
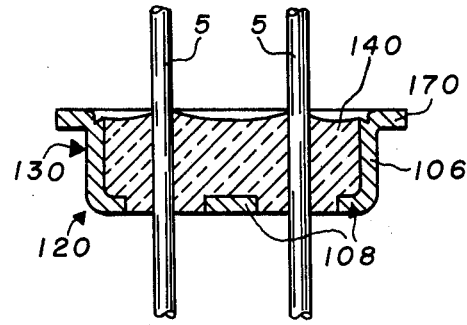
Figure 7:
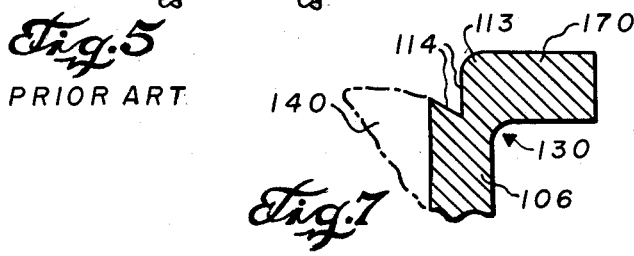

FIGURE 5 also represents the prior art counterpart of another transistor header assembly in a view corresponding to the sectional view of FIGURE 6 of this invention;

FIGURE 6 represents a cross-sectional view of a transistor header assembly similar to that shown in FIGURES 1 and 2, but utilizing a different application of the principle of this invention; and FIGURE 7 is an enlarged fragmentary cross-sectional view of the inside upper corner of the device of FIGURE 6.

Referring now more particularly to the drawing, it will be seen in FIGURES 1 and 2 that the transistor header assembly 20 of this invention consists basically of a preformed transistor header eyelet or shell identified by the numeral 30 and the molded glass area or body 40, and a plurality of lead wires 5.

The transistor header eyelet 30 (of FIGURE 2) actually comprises a form or mold to retain and shape the molten glass into the finished volume 40. Eyelet or shell 30 includes a cylinder sidewall portion 6 formed at its upper end into a peripheral flange portion 7, and at its lower end formed into a generally closed end or plate area 8, but having therein a preformed tab section 90 which extends from plate area 8 in a vertically depending direction as shown in FIGURE 2. The tab 90 is formed from the material stamped out of opening 12.

Figure 3:
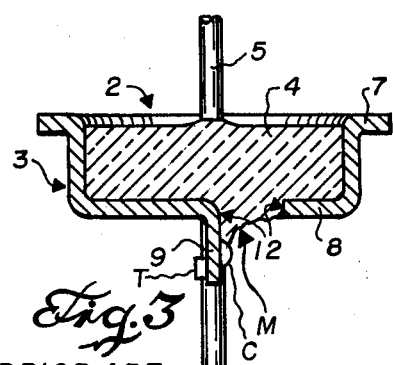
FIGURES 3 and 4 are cross-sectional views corresponding to the sectional view of FIGURE 2; however.
Figure 4:
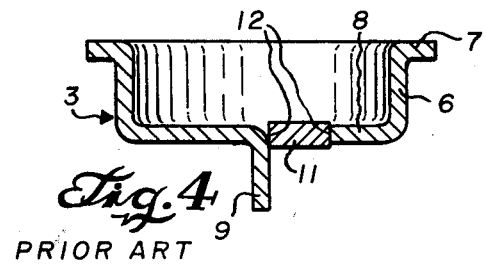

In the prior art processes of making a transistor header assembly, similar to the header assembly 2 shown in FIGURE 3, it was the practice in one instance carefully to pour molten glass into the open center area of the eyelet 3, permit it to wet the surface of tab 9, and to migrate downward along the depending tab 9 in the manner shown in FIGURE 3. This, of course, would result in an unattractive finished structure, but more detrimental than the appearance was the possible electrical interference such a body of insulating material might have because of its presence on the tab 9. Tab 9 was designed to accommodate certain electrical semiconductor elements such as transistor T; the presence of this surplus glass, identified at M in FIGURE 3, would hamper subsequent soldering operations performed at that location, such as electrode contact C, when the transistor T is mounted on the opposite side of the tab 9. Another method practiced by the prior are is shown in FIGURE 4. In this latter prior art embodiment, a small preformed carbon block, reference numeral 11, was inserted into the opening 12 for the purpose of blocking opening 12 so that the molten glass 4 would not migrate along the exposed surface of tab 9. This, of course, accomplished the desired result, but not without the sacrifice of time and expense in placing the carbon block 11 into the opening 12 during the assembly and production operations. Another undesirable result occurring from the use of this carbon block in the prior art process was the previously mentioned chemical combination of the carbon with the surface oxide of the metal eyelet 3 to form carbon-dioxide gas, resulting in bubbles being entrapped in the glass upon hardening.

It was discovered by the present inventors that if a small sharp-cornered depression or groove, such as shown at 14 in FIGURE 2, was placed across the entire width of the tab 90 during the metal stamping operation in which the tab 90 was cut out and bent to its depending position, then the molten glass would not have a tendency to migrate along the edge and surface of tab 9 to the position shown at M in FIGURE 3. It was found that the molten glass would not bridge the sharp-cornered opening or depression 14 and would retain its desired position, as indicated in FIGURE 2. The upper edge of the depression 14 is maintained substantially in line with the bottom of end 8. The probable reason of this retention effect is a combination of the surface tension and cohesiveness of the glass, both acting to avoid wetting and bridging a very sharp corner in the metal.

In the prior art example shown in FIGURE 5, this migration of glass during and after the molding stage of the process is seen to take place even on upper surfaces, such as at the inside upper corner of the radical flange 107 of the header eyelet 103. The glass at this area, called a "meniscus" and indicated in FIGURE 5 by the letter M, is seen to have migrated over and around the smooth curved corner 13 partially overlapping the flat top surface area of flange portion 107. The presence of the glass M at this point interferes with subsequent soldering or bonding operations when the transistor header is to be attached to a heat sink, an enclosure can or other subsequently attached parts. By the application of the principle of this process to this area, as shown in the enlarged view in FIGURE 7, the molten glass 140 will not migrate upward and around the corner of the grooved flange portion 170, but will assume the shape shown in the sectional view, FIGURE 6. The triangular shaped groove 114 formed or cut into the corner section 113 during the die-stamping or drawing fabrication of the eyelet 130 will prevent the molten glass 140 from wetting the surface of the eyelet 130 and migrating around the normally smooth relatively large radius corner 113. The groove 114 defines a complete circle corresponding to the inner circumference of the sidewall 106 of the eyelet and, together with the bottom area 108, forms a confine or boundary to hold the molten glass until it has hardened.

It will be apparent that the use of the process disclosed in this application will result in a transistor product in which several subsequent steps, for example, cleaning, etching, etc., may be eliminated, and the transistor header assembly may be used in subsequent manufacturing stages without additional operations and without interference by the meniscus areas of the glass. It will also be apparent that the groove may be formed by metal cutting or grooving as well as by other known means than stamping.

Although the present invention has been shown and illustrated in terms of specific preferred embodiments, it will be apparent that changes and modifications are possible which do not depart from the teachings herein. Such changes and modifications are deemed to come within the purview of the spirit and scope of this invention.

What is claimed is:

1. A semiconductor header comprising a metallic shell and an insulating material therein, one portion of said shell being a bottom plate with an aperture therein, and a bent-out tab extending downwardly from said bottom plate adjacent said aperture, said bent-out tab having a groove therein adjacent said aperture to prevent said insulating material from flowing through said aperture onto said tab.

2. A semiconductor header comprising a metallic shell of which one end thereof is a bottom plate containing an aperture therein, a tab extending downwardly from said bottom plate adjacent said aperture, said tab being provided with a groove characterized by a sharp boundary, and a body of insulating material encased by said shell, filling at least a portion of said aperture and extending along the surface of said tab in abutting relation with and terminating at said groove.

3. A semiconductor header comprising a cylindrical wall, a peripheral outwardly extending flange at approximately a 90° angle at one end of and intersecting said wall, an end plate at the other end of said wall, a body of insulating material enclosed by said wall and said end plate, said flange and wall intersection being defined by an annular groove at which said insulating material terminates, and at least one terminal lead extending insulatedly through said header and held in place by said insulating material.

References Cited by the Examiner

UNITED STATES PATENTS

| 859,117 | 7/07 | Sagee | 65—355 |
| 1,547,812 | 7/25 | Hendry. | |
| 2,598,498 | 5/52 | Brown | 117—29 |

FOREIGN PATENTS 936,348  12/55  Germany.

ALEXANDER WYMAN, *Primary Examiner.*

IVAN A. LADY, DONALL H. SYLVESTER, EARL M. BERGERT, *Examiners.*